March 22, 1955 R. E. PRICE 2,704,423
TAP RELIEF GRINDER
Filed Feb. 9, 1950 4 Sheets-Sheet 4
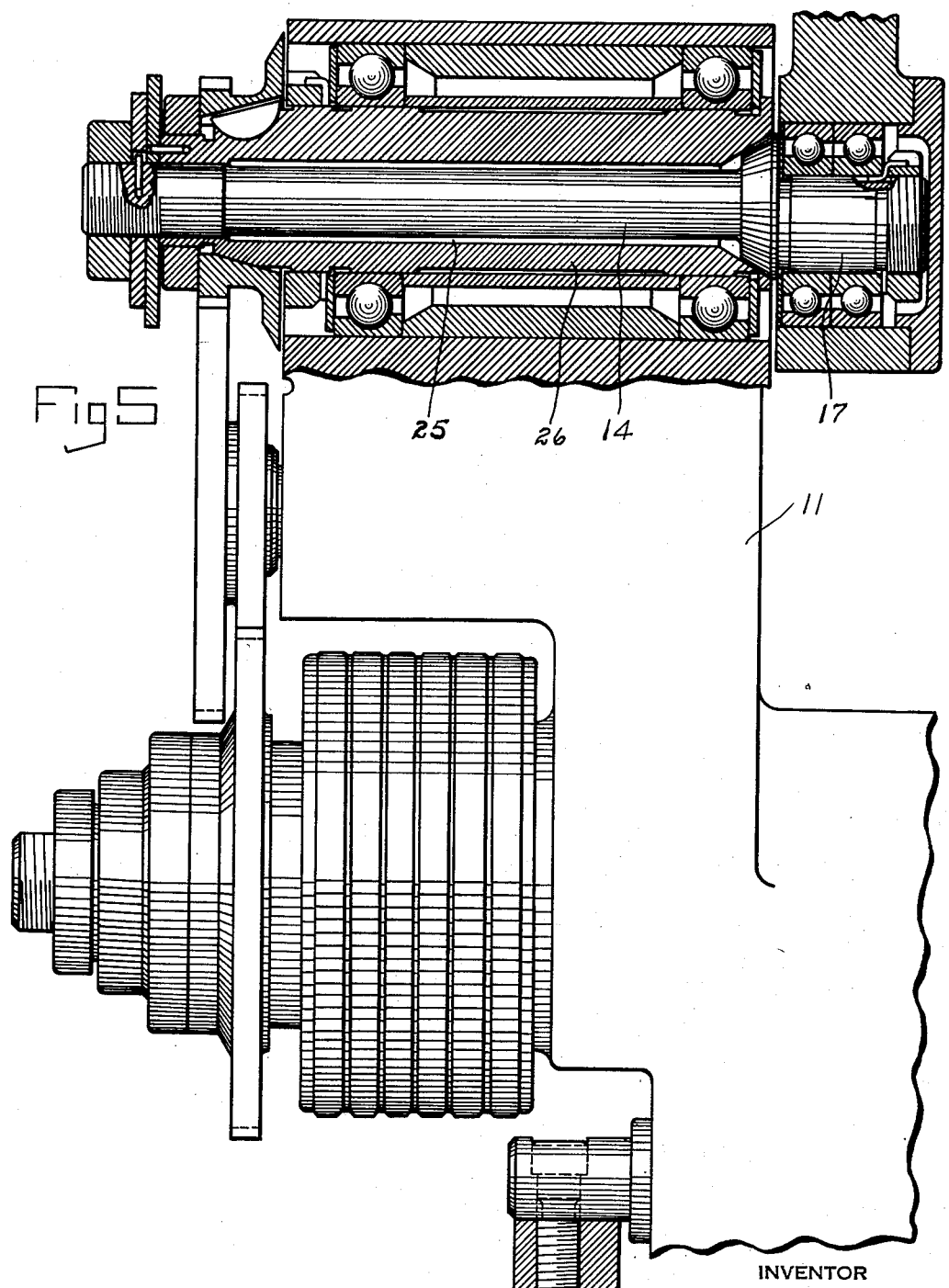
INVENTOR
RALPH E. PRICE
BY
ATTORNEY

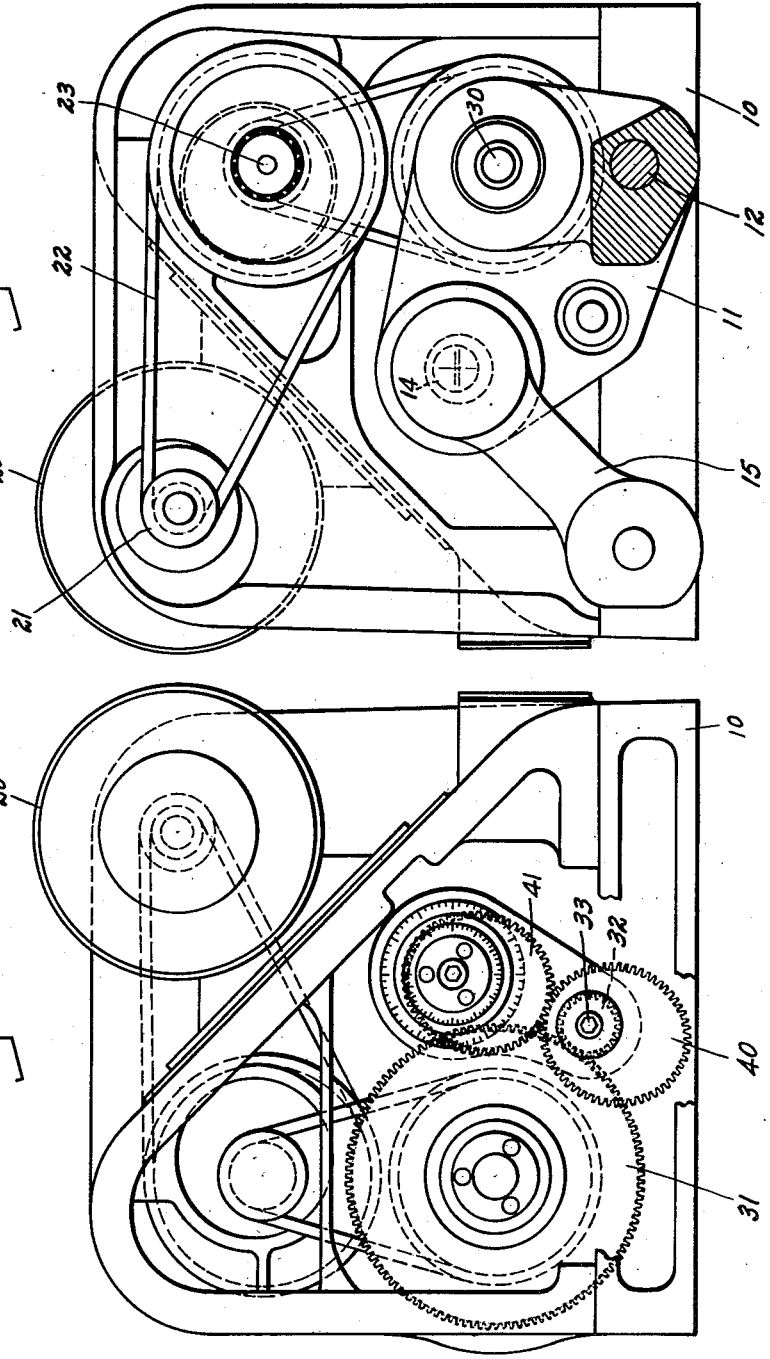

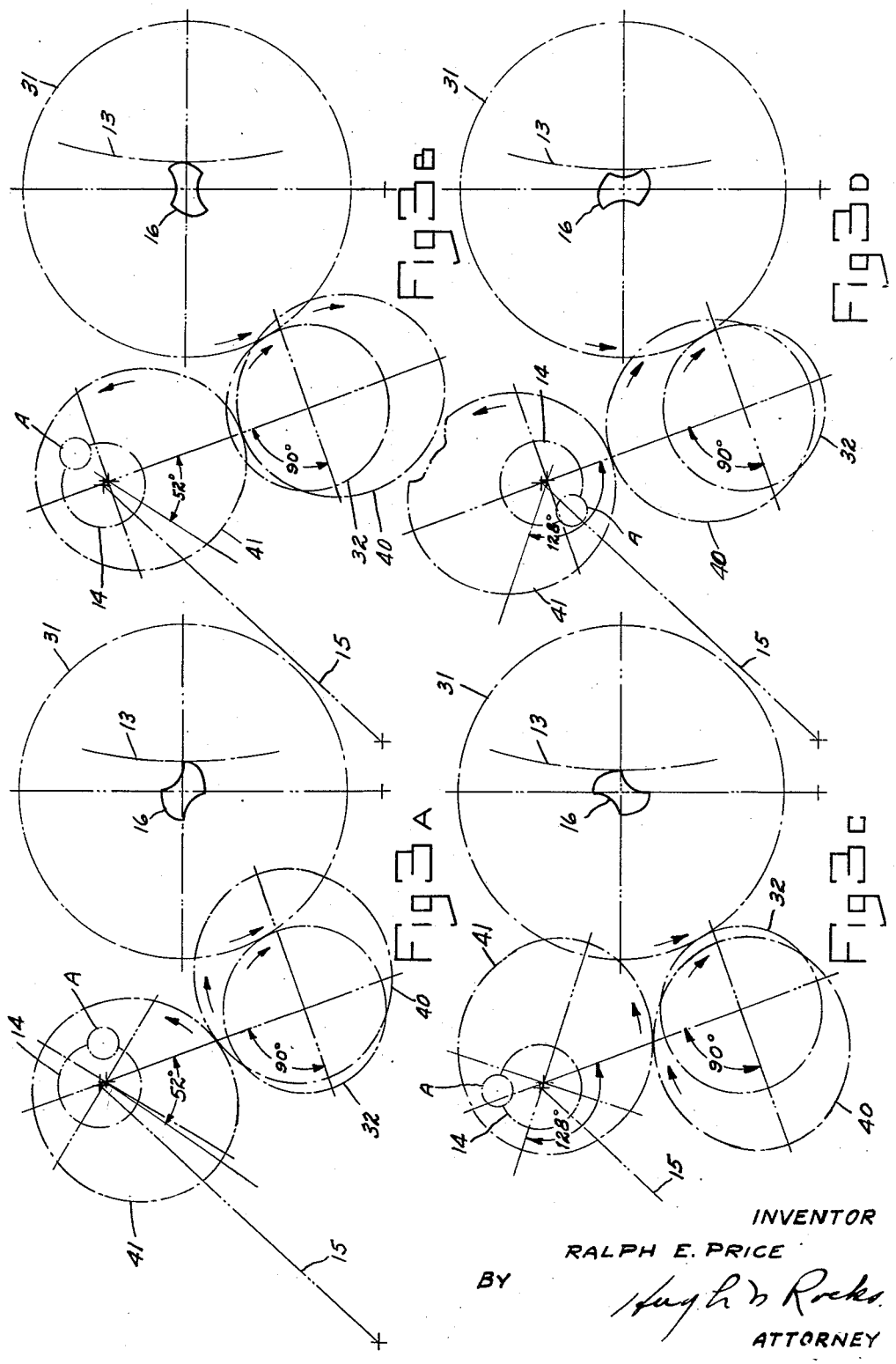

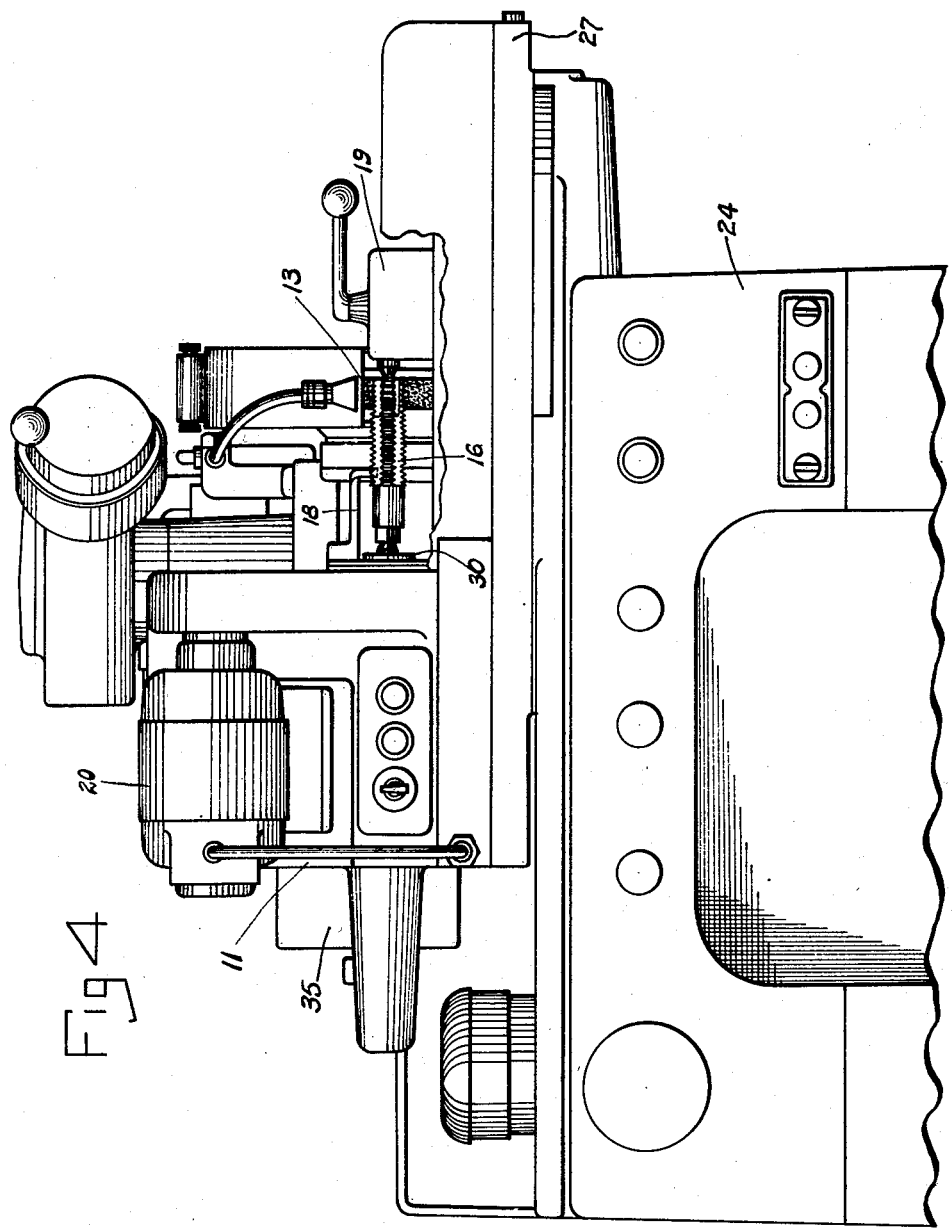

United States Patent Office 2,704,423
Patented Mar. 22, 1955

2,704,423

TAP RELIEF GRINDER

Ralph E. Price, Highfield, Md., assignor to Landis Tool Company, Waynesboro, Pa.

Application February 9, 1950, Serial No. 143,220

3 Claims. (Cl. 51—97)

This invention relates to machines for grinding taps, particularly for grinding a relief on the nose portion of a tap. The invention relates more particularly to an arrangement for grinding two flute taps where the land portion extends over an arc of 90° or more.

The apparatus to which this invention applies is disclosed in detail in co-pending application Ser. No. 95,426, filed May 26, 1949, now abandoned. One of the features disclosed in the co-pending application is a double eccentric arrangement for effecting the reciprocatory movement of the work toward and from the grinding wheel for the purpose of grinding a relief on the land of the tap. This arrangement provides for adjustment of throw and also adjustment of angular relation with the work. This eccentric is driven in timed relation with the work at a rate of one revolution for each land on the tap, i. e., one revolution of the eccentric occurs from the start of grinding one land to the start of grinding the next land.

In order to relieve a tap properly, this rise with the eccentric must coincide with the rotation of a land of the tap in contact with the grinding wheel. In most taps, the land extends through an angle which is less than the angular width of the flute. However, on a great many taps, the land is of greater angular width than the flute and, therefore, would extend beyond the angle corresponding to the rise of the eccentric. Under such conditions, it is impossible to relief grind a tap on a tap grinder in which the speed relation between the work and the eccentric is constant. In order to grind such taps, means must be found to correlate the rotation of the eccentric with the work so that the rise of the eccentric can be made to extend over the entire width of the land.

One solution to this problem is to reduce the rate of rotation of the eccentric during a portion of its rotation without any change in the rate of rotation of the work so that a selected portion of the eccentric may rotate through a given arc while the work piece rotates through a greater arc than a uniform rate would allow. This solution is not limited to two flute taps. It may be supplied to all taps, so that it is not necessary to have one machine for two flute taps and another for taps having three or more flutes.

It is, therefore, an object of this invention to provide a machine for grinding taps having a land portion of greater angular width than the flute.

A further object is to provide eccentric means for rocking the work toward and from the grinding wheel for grinding a relief thereon.

A further object is to provide means for accelerating the rotation of the eccentric through part of its rotation and decelerating the rotation of the eccentric through the other part and timing the decelerated portion of the rotation to the thread lands being ground.

In the drawings,

Figure 1 is a right-hand end view of a tap grinder headstock showing the relation of the eccentric shaft to the headstock.

Figure 2 is a left-hand end view showing the elliptical gears for providing a variable rate of rotation to the eccentric shaft.

Figure 3A shows the angular relation of the driving gears and the work at the beginning of the grinding of a land portion on a two thread tap.

Figures 3B, 3C, and 3D show the angular relation of the gears at intervals of 45° of rotation of the work piece.

Figure 4 is a front elevation a tap grinder.

Fig. 5 is a plan view partly in section showing details of the eccentric shaft mounting.

Since the details of the machine have already been disclosed in the co-pending application, we have limited the drawings to the essentials for explaining the combination of elements which is the subject of this invention.

In Figure 1, numeral 10 indicates a headstock housing in which is mounted a headstock 11 for rotatably supporting a two flute tap 16, pivotally supported at 12 for movement toward and from a grinding wheel 13 rotatably mounted in wheel base 35. Said wheel base is slidably mounted on bed 24 for movement transversely of work carriage 27. Said tap is mounted between the centers of headstock 11 and footstock 19. A driving dog 18 in said headstock serves to rotate tap 16 during the grinding operation. A double eccentric shaft mounting consists of a shaft 14 having an eccentric portion 17 at one end thereof and is mounted for angular adjustment in an eccentric bore 25 in a sleeve 26. Sleeve 26 is rotatably mounted in headstock 11. Said headstock is mounted on a carriage 27 which in turn is slidably mounted on bed 24.

Power for driving the headstock is provided by a motor 20 through a pulley 21 and a belt 22 to an intermediate shaft 23, which provides a speed reduction to headstock spindle shaft 30. A gear 31 on said headstock spindle engages a gear 32 on idler shaft 33. For a two flute tap, the idler shaft and the eccentric shaft are driven at double the speed of the tap so that the eccentric rotates through a complete revolution while the work piece rotates through the space of one flute and one land. The design of said gears is such that, when the short radius portion of the idler gear 40 engages the long radius portion of the eccentric shaft gear 41, a movement of 180° of said idler gear causes a movement of 104° of gear 41 and a corresponding movement of the eccentric shaft 14. Said eccentric shaft may be angularly adjusted relative to gear 41 so that said 104° will coincide with an intermediate portion of the throw or rise of said eccentric. The 180° rotation of the idler gear is equivalent of 90° rotation of the work, in this case, the extent of one land. Thus, 104° rotation of the eccentric shaft 14 is applied to grinding the relief on the 90° land of the tap.

As the trailing end of the land passes the grinding wheel 13, the radius of the idler gear 40 at the point of engagement with gear 41 begins to increase. The radius of the eccentric shaft gear 41 at the same point begins to decrease and, therefore, to move eccentric shaft 14 at increased speed through the next 256°, which corresponds to the 90° flute on the tap. The other land on the tap is then in position to be ground.

When headstock 11 is in either extreme forward or rearward position, the high and low points of eccentric shaft 14 are in longitudinal alignment with link 15. In Figure 3A, gear 41 is shown as having moved a short distance from this position in a counterclockwise direction. Thus, the land of the tap 16 is just beginning to engage the grinding wheel 13. Engagement between the short radius portion of idler gear 40 and the long radius portion of eccentric shaft gear 41 begins at this point. The relative angular position of the high point of the eccentric is indicated by the circle A.

In Figure 3B, the tap has rotated 45°, gear 40 has rotated 90°, and gear 41 and eccentric shaft 14 have rotated 52° to grind the first half of the land. During the next 45° rotation of the tap as shown in Figure 3C, the remainder of the land is ground.

In Figure 3D, the tap has rotated another 45°, or halfway across the flute. At the same time, gear 40 has rotated 90°; but gear 41 has rotated 128°, due to the fact that the 90° arc on this part of gear 40 is longer than the arc subtending the same angle on gear 41. Therefore, gear 41 must move through the larger angle to return the eccentric shaft 14 to its original angular position relative to the land on the tap.

I claim:

1. In a machine for grinding taps and the like having a base, a grinding wheel support slidably mounted thereon, a grinding wheel rotatably mounted on said support, a carriage and a work support mounted thereon for movement transversely of said grinding wheel, means on said work support for rotatably supporting a work piece comprising a headstock housing, a headstock assembly therein having a work drive spindle and means for rotating same, means for effecting said transverse movement of said work support including a shaft rotatably mounted in said headstock assembly and having an eccentric portion thereon, a link having one end connected to said eccentric portion and having the other end connected to a fixed part of said carriage, means for driving said shaft from said work drive spindle including means for rotating said shaft as a speed relative to that of the work drive spindle in accordance with the number of lands on the tap to be ground, said rotating means including means for reducing the speed of said shaft during contact between the land of the tap and the grinding wheel.

2. In a machine for grinding taps and the like having a base, a grinding wheel support slidably mounted thereon, a grinding wheel rotatably mounted on said support, a carriage and a work support mounted thereon for movement transversely of said grinding wheel, means on said work support for rotatably supporting a work piece comprising a headstock housing a headstock assembly therein having a work drive spindle and means for rotating same, a shaft operably connected with said spindle and having an eccentric portion thereon, a link having one end connected to said eccentric portion and the other end connected to a fixed part of the carriage for effecting said transverse movement of said work support, the connection between said spindle and said shaft including gears for providing a speed ratio between said spindle and said shaft in accordance with the number of oscillations per revolution required of the work piece, said connection also including elliptical gears for varying the rate of rotation of said shaft while the rate of rotation of the work piece remains constant.

3. In a machine for grinding taps and the like having a base, a grinding wheel support slidably mounted thereon, a grinding wheel rotatably mounted on said support, a carriage and a work support mounted thereon for movement transversely of said grinding wheel, means on said work support for rotatably supporting a work piece comprising a headstock housing, a headstock assembly therein having a work drive spindle and means for rotating same, a shaft operably connected with said spindle and having an eccentric portion thereon, a link having one end connected to said eccentric portion and the other end to a fixed part of the carriage for effecting said transverse movement of said work support, the connection between said spindle and said shaft including gears for providing a speed ratio between said spindle and shaft in accordance with the number of oscillations per revolution required of the work piece, said connection also including means for varying the rate of rotation of said shaft in the course of a single revolution while the rate of rotation of the work drive spindle remains constant.

References Cited in the file of this patent

UNITED STATES PATENTS

| | | |
|---|---|---|
| 1,609,963 | Robinson | Dec. 7, 1926 |
| 2,116,686 | Odom | May 10, 1938 |
| 2,209,228 | Judge | July 23, 1940 |
| 2,350,234 | Horton | May 30, 1944 |
| 2,379,287 | Egleston | June 26, 1945 |

FOREIGN PATENTS

| | | |
|---|---|---|
| 432,143 | Germany | July 31, 1926 |